United States Patent [19]

Freisleben

[11] 4,042,297
[45] Aug. 16, 1977

[54] FILM STRIP PROJECTION EQUIPMENT

[75] Inventor: Reinhard Freisleben, Neubaldham, Germany

[73] Assignee: Soding TV GmbH & Co. Bild & Ton International, Munich, Germany

[21] Appl. No.: 659,985

[22] Filed: Feb. 23, 1976

[30] Foreign Application Priority Data

Apr. 17, 1975 Germany .............................. 2516988

[51] Int. Cl.² .................... G03B 23/08; G03B 23/02; G03B 21/00
[52] U.S. Cl. ................. 353/109; 352/78 R; 352/126; 353/DIG. 2
[58] Field of Search .......................... 353/109, DIG. 2; 352/78 R, 126; 360/81

[56] References Cited

U.S. PATENT DOCUMENTS

| 2,265,992 | 12/1941 | Beck | 352/126 |
| 2,897,721 | 8/1959 | Cohn et al. | 353/109 |
| 3,301,128 | 1/1967 | Brandt et al. | 353/109 |
| 3,472,516 | 10/1969 | Rhoades | 360/81 |
| 3,473,870 | 10/1969 | Platt | 353/DIG. 2 |

Primary Examiner—Steven L. Stephan
Attorney, Agent, or Firm—Lerner, David, Littenberg & Samuel

[57] ABSTRACT

Film strip projection device for the projection of endless film strip, especially slide film strips, which is passed along a film trap of a projection optics system, by a transport device which catches in the film perforation. The film strip is guided in a closed, essentially ring-form track, whose length is only a little shorter or equal to the length of the film strip.

5 Claims, 6 Drawing Figures

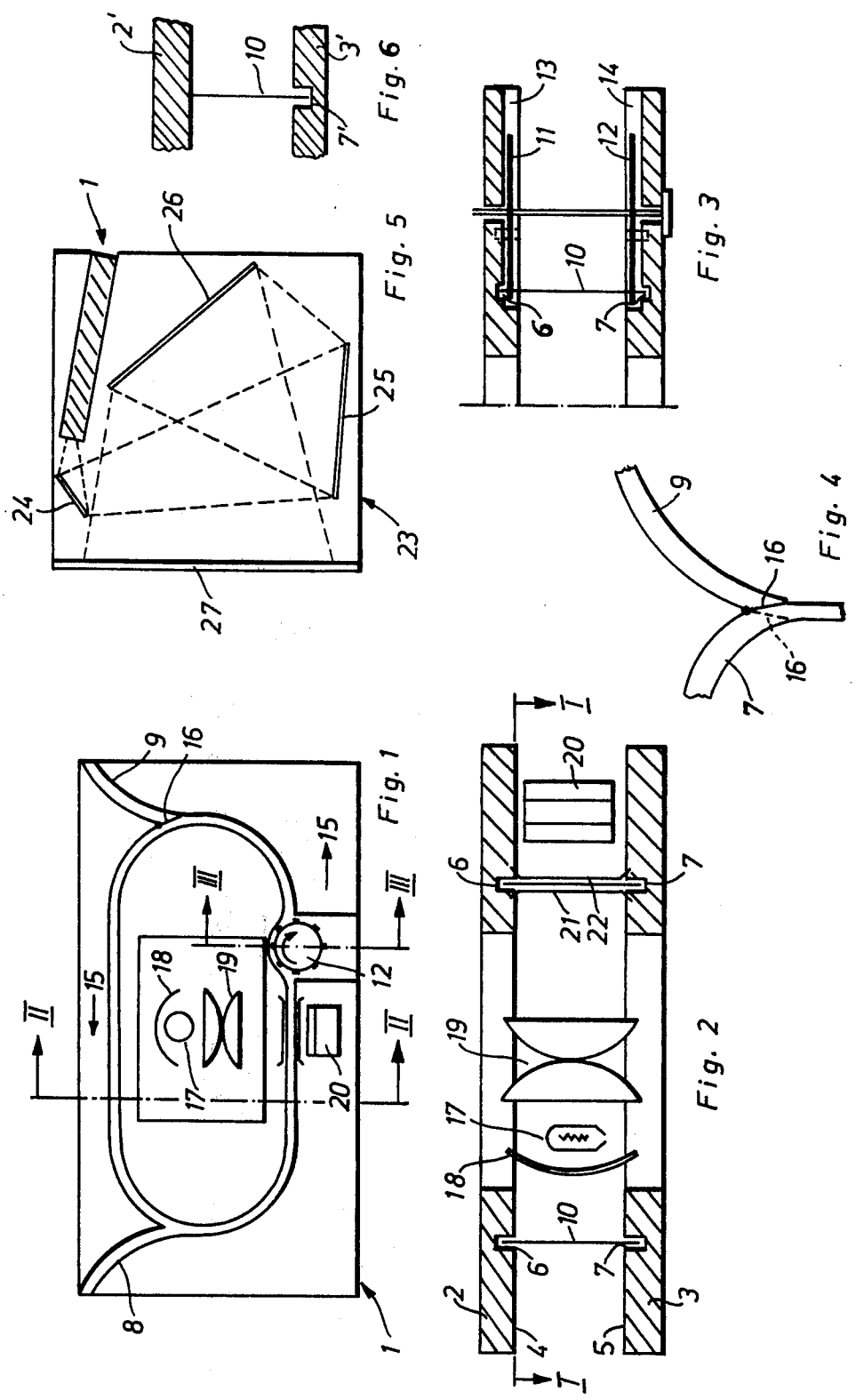

FILM STRIP PROJECTION EQUIPMENT

The invention refers to a film strip projection device for the projection of endless film strips, especially slide film strips, which can be passed by the viewer of a projection optical system by means of a transporting device gearing into the film perforation.

Projection equipment of this sort, used at present, employs a film strip, glued to form a closed loop, wound in the form of a spool, the end of the spool inside and the end of the spool outside being connected. This film spool is held by a bar or loosely, so that it can turn freely, when the film material is pulled off from the inside and is fed back to the outside of the spool. Apart from the fact, that the film strip — usually a slide film strip — must be glued together at the ends, this system has the disadvantage that insertion as well as exchange of the film strips is extremely bothersome.

The film is also always wound back onto itself, so that the individual layers of the wound-up spool have frictional contact thus damaging the film.

The work of this invention is to create a film strip projection device which not only handles the film carefully, but also eliminates glueing of the film ends, thus simplifying handling.

This task is solved in that the film strip is guided in a closed ringforming channel, with a length that is equal or a little smaller than the length of the film strip. The film forms here a loop, corresponding to its length; coordination of film length and channel guaranteeing that film end and film start can be taken up without problems by the transporting device. By eliminating the connection between the film ends, handling is evidently made easier, and the film is treated carefully since it need not be wound back onto itself.

A very simple solution is achieved, if the channel consists of a circular closed guiding groove, into which the film strip can be set in with one edge, and of a guiding surface opposite of it. The guiding groove together with a guiding surface are a very simple guiding device, in which the film is advanced by the transporting device. As the film is only held and guided along the edges, the actual picture surface is without mechanical stress or friction, so that the most careful treatment is assured. Preferably the channel is formed of two guiding grooves in which the film strip is inserted with its edges.

It is of special advantage if an open branch groove is attached tangentially from the outside of the guiding groove or grooves, and the transporting device has a reversible rotation. With this construction the film can be fed through the branch groove into the channel formed by the guiding groove; and due to the tangential fitting of the branch groove, the film will pass the branch groove undisturbed and will run endlessly, with the direction of rotation of the transporting device, whereas upon reversal of the direction of rotation, the film will be discharged automatically through the branch groove, so that the exchange of film strips is made extremely easy. This can yet be simplified further, if the guiding groove or grooves each have two open-end branch grooves which are tangentially opposite, of which at least one has a switch tongue, closing off the end; whereby the sense of rotation of the transporting device is irreversible. The transporting device does not need to be reversible, as — with the opposite arrangement of the branch grooves — the film strip can be fed in as well as taken out with the same direction of rotation; in the latter case by simply opening the switch tongue of the branch groove which is closed during the normal run.

To ensure the engagement of the transporting device into the film perforation, the guiding grooves in the area of the transporting device are preferably arched concentrically to a transporting gearing, so that the film strip is resting with tension against the transport gearing for a large part of the circumference. This construction has the added advantage, that even when the film strip is a little shorter than the length of the guiding grooves, transporting will not be impaired, as long as the distance between the two ends of the film in the guiding grooves is not larger than the part of the transport gearing in contact with the film.

The simplest construction is obtained, if the guiding grooves with branch grooves are formed of slots which are cut into parallel, supported plates; the plates inside the guiding grooves being recessed to take photometrical and optical equipment. These plates offer the advantage of being a very compact, cassette-type, self-supporting unit, which can be used in many ways, and can especially be fitted as a unit into a showcase, which is provided with a surface mirror system extending the projection path, to make the projected picture visible for example on a screen on an enlarged scale.

In the following the invention is described in details by way of example with schematic drawings.

FIG. 1 is a schematic topview of a film strip projector in accordance with the invention.

FIG. 2 is a sectional view along the line II—II in FIG. 1.

FIG. 3 is a sectional view along the line III—III in FIG. 1.

FIG. 4 is a drawing in enlarged scale of a guiding groove switch.

FIG. 5 shows the film strip projector according to FIG. 1 as an operational unit in a showcase.

FIG. 6 shows a variant of the film strip guidance.

The film strip projection equipment 1 here shown, consists of two plane parallel plates 2 and 3 — supported in parallel intervals — their front surfaces 4 and 5 facing each other having a cut groove closed to an oval, 6 resp. 7; the grooves being in perfect alignment with each other. It is also possible, as shown in FIG. 6, to provided only one of the parallel plates 2' and 3' with a groove 7', so that the other plate 2' serves as a guiding surface. Each groove, on diametrically opposite sides, as can be seen especially from FIG. 1, has a branch groove 8, resp. 9, which lead to the outside edges of plate 2 and 3, and which end in opposite directions tangentially in the guiding grooves 6 and 7. Of these branch grooves, the branch groove 9 can be closed with a switch tongue, as FIG. 4 shows.

The distance between plates 2 and 3 has been selected so that it is a little smaller than the height of a film strip 10, which preferably is a slide film strip, fitting into the guiding grooves 6 and 7 with its perforated edges and its length being equal or only a little smaller than the length of the guiding grooves 6, resp. 7. Transport of the film strip is done through a transport device, of which here only the transport gears 11 and 12 — see especially FIG. 3 — are shown; their drive can be of any type In the area of these transport gears 11 and 12, the plates are recessed, 13, resp. 14; these recesses take the transport gears 11, resp. 12, so that they can be held at the height of the film perforation. To catch the film perforation, the outside wall of the guiding grooves is open, and the guiding grooves 6 and 7 are turned out at this point — as can be seen especially from FIG. 1 — so that the film strip lies against these gears under tension for a considerable part of the circumference.

A film strip is for example inserted over the upper and lower branch grooves 8 into the guiding grooves 6 and 7, and is transported in the direction of arrow 15; the switch tongue then closing the two upper and lower branch grooves 9, so that the film strip necessarily runs with guidance through the outside groove walls. Considering the opposite tangential leading-in of branch grooves 8 and 9, the film strip can pass, without special measures, the branch grooves 8, in a normal run. If the film is to be taken from the device, then switch tongue 16 — as shown in FIG. 4 — need only be turned into the dotted position, so that the film strip is guided through this tongue outward into branch grooves 9, this switch tongue 16 naturally pointing with its free tongue tip against the direction of the film. Principally, one could do away with the branch grooves 9 with switch tongue 16. In this case, for the guiding-out of the film strip 10, the direction of rotation of the transport gears would have to be reversed, so that the film then is guided out through the branch grooves 8.

Plates 2 and 3 should be recessed between guiding grooves 6 and 7, to give room for a light source 17 with reflector 18 and condensor 19, to which is coordinated a lens 20 on the opposite side of the film strip. Between these two insets, on both sides of grooves 6 and 7 a film trap 21,22 is located, which serves for the flattening of the film strip for the projection.

With plates 2 and 3 this, device becomes a box-type, cassette-like unit, which is extremely suitable as an iset for showcases 23, as is shown schematically in FIG. 5; this unit 1 will have such a position in the showcase, that an extension of the projection path is easily obtained with surface mirrors 24,25,26, and with that an enlarged picture surface, which is projected onto a screen 27. Such an opposite arrangement has the advantage, that adjusting and focusing is not necessary, and that such a showcase can be operated by mere switching on and off. FIG. 5 shows in dotted lines the rays, to illustrate the extension of the paths.

With this oval path, correspondingly large-sized transport gears could be used at the circular turning points, which would catch the upper and lower perforation of the film strip; then guiding grooves would only be necessary in the straight parts of the path.

I claim:
1. A film strip projection device for the projection of an endless running film strip comprising:
 a projection optics system having a film trap through which said film strip passes, said film strip being open ended and flexible;
 a closed substantially circular track formed in said projection device for guiding said film strip;
 a transport device for engaging and driving said film strip around said track;
 said film strip including first and second longitudinal edges;
 a pair of spaced-apart wall plates disposed in said device, said wall plates being perpendicular to the flat faces of said film strip; and
 said track including a guiding groove formed on each of said wall plates with only said first and second longitudinal edges of said film strip being arranged to travel in said respective guiding grooves and be guided thereby about said track.

2. A device in accordance with claim 1, said guiding grooves being continuous and closed for guiding the longitudinal edges of said film strip.

3. A device in accordance with claim 1 further including a branch groove tangentially arranged with respect to said guiding grooves for guiding said film strip into said closed track.

4. A device in accordance with claim 1 further including a branch groove tangentially connected to said guiding grooves for guiding said film strip out of said closed track, said branch groove further including means for opening and closing the connection between said guiding groove and said branch groove.

5. A device in accordance with claim 1 wherein the depth of said guiding grooves is at least equal to the width of the film perforations along the longitudinal edges of said film strip.

* * * * *